Patented May 13, 1930

1,758,382

UNITED STATES PATENT OFFICE

JULIUS VON BRAUN AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF CATALYTICALLY REDUCING ANTHRAQUINONE COMPOUNDS AND NEW HYDROGENIZED PRODUCTS DERIVED THEREFROM

No Drawing. Original application filed February 27, 1926, Serial No. 91,227, and in Germany March 3, 1925. Divided and this application filed June 10, 1927. Serial No. 198,006.

Our invention relates to a new process of catalytically reducing anthraquinone compounds and new hydrogenized products derived therefrom. The process consists in treating the anthraquinone compounds in a non-acidic medium with hydrogen at elevated temperatures and preferably under pressure in the presence of the usual base metal reduction catalysts advantageously with addition of an organic solvent or diluent.

It is a very remarkable fact that our process runs in phases, so that according to the quantity of hydrogen allowed to act upon anthraquinone compounds, different products of distinct degrees of hydrogenation can be prepared. If anthraquinone is subjected to this process, in the first phase of the reaction anthranol (or anthrone) is obtained with a practically quantitative yield. In the second phase of reaction tetrahydroanthranol, and by allowing to react still a further quantity of hydrogen, octohydroanthranol is obtained. The final product of the catalytical reduction is octohydroanthracene.

All the known base metal reduction or hydrogenation catalysts are suitable for our process, but we have found the mixtures of catalysts prepared for instance by precipitating an aqueous solution of a mixture of nickel sulfate, cobalt sulfate and copper sulfate by means of a carbonate of soda solution to be especially effective.

By the expressions base metal reduction catalysts and "base metal hydrogenation catalysts" we purpose to include those known catalytic agents of reduction and/or of hydrogenation which contain one or more of the base metals, which base metals are present in the catalytic agent either in their elemental form or in the form of their respective oxides or salts.

The new process is not limited to anthraquinone itself, as also derivatives of anthraquinone, for example alkly-, hydroxy-, nitro-, amino-anthraquinones naphthan-thraquinone etc. easily can be catalytically reduced in the described manner.

In order to obtain the higher hydrogenized compounds one may start, instead of from an anthraquinone compound itself, from the anthranol body as the next step of hydrogenation.

The new products are intended to be used as starting materials for the production of dyestuffs and therapeutical products. The following examples illustrate the nature of our invention and in what manner it is to be performed, the parts being by weight and all temperatures in degrees centigrade.

Example 1

A solution of 52 parts of anthraquinone in 100 parts of decahydronaphthalene is treated in an autoclave at 160–170° C. with hydrogen in the presence of a mixture of carbonates of nickel, iron and copper as catalyst, until a quantity of hydrogen is absorbed corresponding to 12 atoms. In this manner pure octohydroanthranol is obtained in a good yield, which compound separates from the partly evaporated solution of the reaction mass. The new colorless compound corresponding to the formula:

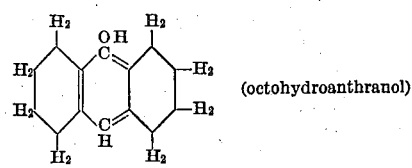

(octohydroanthranol)

which melts at 124° C. is difficultly soluble in alkalies and yields an acetyl compound melting at 52° C., a benzoyl compound melting at 128° C. and a monobromo-derivative melting at 123° C. It couples with diazocompounds to form azodyestuffs. By oxidizing it with chromic acid a yellow quinone is formed having the melting point of 180° C.

Example 2

If 1.4-dimethylanthraquinone is subjected to our process, a new compound of the octohydroanthranol step, having probably the formula:

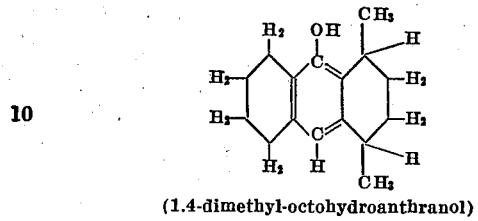

(1.4-dimethyl-octohydroanthranol)

is obtained. It crystallizes from ligroin as colorless needles melting at 83–84° C.

As final product of the catalytic reduction the hydrocarbon is obtained.

In the following we give some statements relating to reduced derivatives of other anthraquinone compounds, which all can be obtained according to our process of catalytic reduction.

Among the further hydrogenized derivatives of tetral-2.3-anthraquinone of the formula

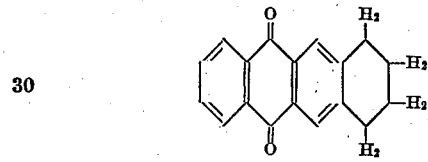

obtainable by condensing tetrahydronaphthalene with phthalic acid anhydride and acting with sulfuric acid on the ortho-(tetroyl-2-) benzoic acid thus formed. (See Berichte d. Deutsch. Chem. Ges., Vol. 54, page 2244) may be mentioned:

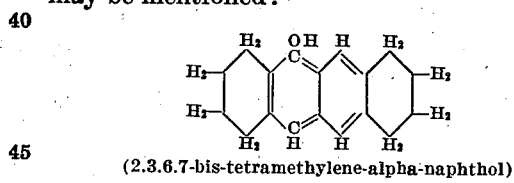

(2.3.6.7-bis-tetramethylene-alpha-naphthol)

crystallizing from glacial acetic acid as yellowish needles, melting at 159° C.

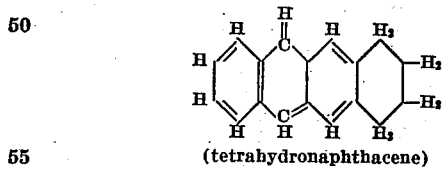

(tetrahydronaphthacene)

crystallizing from hydrocarbons as greenish yellow leaflets, melting at 235° C. and as final products the hydrocarbons

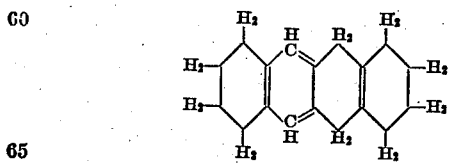

decahydronaphthacene, melting at 82° C., and

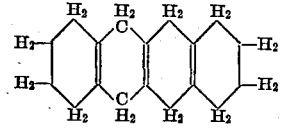

perhydronaphthacene, melting at about 50° C.

Among the hydrogenized derivatives of beta-hydroxy-anthraquinone may be named for example:

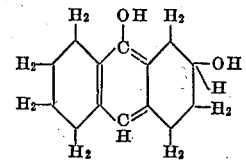

(beta-hydroxy-octo-hydroanthranol)

crystallizing from benzene as colorless needles, melting at 164° C.

This application is a division of our copending application Serial No. 91,227, filed February 27, 1926.

We claim:

1. Process of producing an octohydroanthranol compound which comprises acting under pressure upon one molecular proportion of an anthraquinone compound in the presence of a base metal hydrogenation catalyst with substantially twelve atomic proportions of hydrogen.

2. Process of producing an octohydroanthranol compound which comprises acting under pressure upon one molecular proportion of an anthraquinone compound, with the addition of an organic diluent, in the presence of a base metal hydrogenation catalyst with substantially twelve atomic proportions of hydrogen.

3. Process of producing an octohydroanthranol compound which comprises acting under pressure and at elevated temperatures upon one molecular proportion of an anthraquinone compound in the presence of a base metal hydrogenation catalyst with substantially twelve atomic proportions of hydrogen.

4. As a new product octohydroanthranol of the formula:

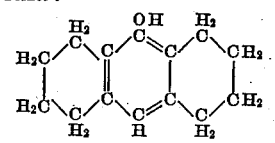

which is soluble in alkalies and the usual organic solvents, yields azo dyestuffs when combined with diazo compounds and forms acetyl-, benzoyl-, and a mono-bromo-substitution product.

In testimony whereof we affix our signatures.

JULIUS von BRAUN.
OTTO BAYER.